(12) United States Patent
Sato

(10) Patent No.: US 9,580,599 B2
(45) Date of Patent: Feb. 28, 2017

(54) THERMOPLASTIC RESIN COMPOSITION AND TIRE USING SAME

(71) Applicant: The Yokohama Rubber Co., Ltd., Tokyo (JP)

(72) Inventor: Shun Sato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 155 days.

(21) Appl. No.: 14/378,362

(22) PCT Filed: Nov. 19, 2012

(86) PCT No.: PCT/JP2012/079976
§ 371 (c)(1),
(2) Date: Aug. 13, 2014

(87) PCT Pub. No.: WO2013/121644
PCT Pub. Date: Aug. 22, 2013

(65) Prior Publication Data
US 2015/0018487 A1    Jan. 15, 2015

(30) Foreign Application Priority Data

Feb. 14, 2012 (JP) ................................. 2012-029591

(51) Int. Cl.
| | | |
|---|---|---|
| *C08L 21/00* | (2006.01) | |
| *C08L 29/04* | (2006.01) | |
| *C08L 77/00* | (2006.01) | |
| *B60C 1/00* | (2006.01) | |
| *C08L 29/02* | (2006.01) | |
| *C08J 3/00* | (2006.01) | |

(52) U.S. Cl.
CPC ............ *C08L 77/00* (2013.01); *B60C 1/0008* (2013.04); *C08J 3/005* (2013.01); *C08L 21/00* (2013.01); *C08L 29/02* (2013.01); *C08J 2377/00* (2013.01); *C08J 2439/04* (2013.01)

(58) Field of Classification Search
CPC .......... C08L 77/00; C08L 29/02; C08L 21/00; C08L 29/04; C08J 3/005; B60C 1/0008
See application file for complete search history.

(56) References Cited

U.S. PATENT DOCUMENTS

| | | | | |
|---|---|---|---|---|
| 6,011,115 A | * | 1/2000 | Miharu | ................... C08L 23/08 428/34.1 |
| 2010/0112257 A1 | | 5/2010 | Morooka | |
| 2010/0147432 A1 | | 6/2010 | Morooka | |
| 2013/0146194 A1 | | 6/2013 | Kawaguchi | |
| 2013/0156982 A1 | * | 6/2013 | Kawaguchi | ......... C08L 23/0861 428/36.7 |

FOREIGN PATENT DOCUMENTS

| | | |
|---|---|---|
| EP | 2474570 A1 | 7/2012 |
| JP | 2002-388770 A | 11/2002 |
| JP | 2010-132850 A | 6/2010 |
| JP | 4862954 B1 * | 1/2012 |
| JP | 4862954 B1 | 1/2012 |
| WO | WO-2007/083785 A1 | 7/2007 |
| WO | WO-2012/023328 A1 | 2/2012 |
| WO | WO-2012/026166 A1 | 3/2012 |

OTHER PUBLICATIONS

Russo et al., "Thermal and mechanical characterisation of films from Nylon 6/EVOH blends", European Polymer Journal, 35 (1999) 1261-1268.

* cited by examiner

*Primary Examiner* — Alexa Neckel
*Assistant Examiner* — Marie Reddick
(74) *Attorney, Agent, or Firm* — Polsinelli PC

(57) ABSTRACT

Provided is a thermoplastic resin composition which exhibits little dependence of air permeability on fatigue. The present invention is a thermoplastic resin composition which comprises an ethylene-vinyl alcohol copolymer and a polyamide resin, said thermoplastic resin composition being characterized in that only one maximal peak point assignable to crystallization is observed in the curve of heat flow versus temperature as determined by differential scanning calorimetry of a melt-kneaded mixture of 25 parts by mass of the ethylene-vinyl alcohol copolymer and 75 parts by mass of the polyamide resin in a cooling process.

20 Claims, 1 Drawing Sheet

THERMOPLASTIC RESIN COMPOSITION AND TIRE USING SAME

CROSS REFERENCE TO RELATED APPLICATIONS

This application is a National Phase filing under 35 U.S.C. §371 of PCT/JP2012/079976 filed on Nov. 19, 2012; and this application claims priority to Application No. 2012-029591 filed in Japan on Feb. 14, 2012 under 35 U.S.C. §119; the entire contents of each application is hereby incorporated by reference.

TECHNICAL FIELD

The present invention relates to a thermoplastic resin composition. More specifically, the present invention relates to a thermoplastic resin composition that can be suitably used for an inner liner of a pneumatic tire. The present invention also relates to a pneumatic tire including a layer made of the thermoplastic resin composition.

BACKGROUND ART

Ethylene-vinyl alcohol copolymers have excellent gas barrier properties. However, since ethylene-vinyl alcohol copolymers have poor heat drawability compared with polypropylene or polystyrene, a method in which polyamide resin is blended is proposed as a countermeasure thereof (Patent Documents 1 and 2).

Focusing attention on excellent gas barrier properties of ethylene-vinyl alcohol copolymer, there has been an attempt to use ethylene-vinyl alcohol copolymer as an inner liner of a pneumatic tire (Patent Document 3).

PRIOR ART DOCUMENTS

Patent Documents

Patent Document 1 Japanese Laid-open Patent Publication No. Sho52-141785
Patent Document 2 Japanese Laid-open Patent Publication No. Sho58-36412
Patent Document 3 Japanese Laid-open Patent Publication No. 2011-32391

SUMMARY OF THE INVENTION

Problem to be Solved by the Invention

Although ethylene-vinyl alcohol copolymers have excellent gas barrier properties, when ethylene-vinyl alcohol copolymers are used as an inner liner of a pneumatic tire, there is a problem that air permeability is increased due to repeated deformation (fatigue), i.e., change in air permeability is caused by fatigue. An object of the present invention is to provide a thermoplastic resin composition in which rate of change in air permeability due to fatigue is small.

Means for Solving Problems

The present inventors found that by adding a polyamide resin having high compatibility with an ethylene-vinyl alcohol copolymer, properties of matrix phase is largely changed and change in air permeability can be inhibited, thereby completing the present invention.

The present invention is a thermoplastic resin composition comprising an ethylene-vinyl alcohol copolymer and a polyamide resin, wherein only one maximal peak point assignable to crystallization is observed in the curve of heat flow versus temperature in a cooling process of a differential scanning calorimetry of a melt-kneaded product of 25 parts by weight of the ethylene-vinyl alcohol copolymer and 75 parts by weight of the polyamide resin.

Preferably, the ethylene content of the ethylene-vinyl alcohol copolymer is 25 to 60 mol %.

Preferably, the thermoplastic resin composition further comprises a modified rubber including an acid anhydride group or an epoxy group.

Preferably, the modified rubber including an acid anhydride group or an epoxy group is an ethylene-α-olefin copolymer, ethylene-unsaturated carboxylic acid copolymer, or ethylene-unsaturated carboxylic acid ester copolymer each including an acid anhydride group or an epoxy group.

Preferably, the amount of polyamide resin with respect to the total amount of the ethylene-vinyl alcohol copolymer and the polyamide resin is 5 to 80% by weight.

Preferably, the thermoplastic resin composition comprises 70 to 280 parts by weight of the modified rubber with respect to 100 parts by weight of the total amount of the ethylene-vinyl alcohol copolymer and the polyamide resin.

The present invention is a film obtained by forming the thermoplastic resin composition.

The present invention is a laminate comprising the film.

The present invention is a pneumatic tire comprising a layer of the thermoplastic resin composition.

The present invention is a method for producing a thermoplastic resin composition comprising an ethylene-vinyl alcohol copolymer and a polyamide resin, the method comprising a step of selecting a combination of an ethylene-vinyl alcohol copolymer and a polyamide resin such that when a melt-kneaded product of 25 parts by weight of the ethylene-vinyl alcohol copolymer and 75 parts by weight of the polyamide resin is prepared and a curve of heat flow versus temperature in a cooling process is measured for each melt-kneaded product by differential scanning calorimetry, only one maximal peak point assignable to crystallization is observed in the curve versus temperature.

Effect of the Invention

The thermoplastic resin composition of the present invention has small rate of change in air permeability due to fatigue.

DESCRIPTION OF EMBODIMENTS

The present invention is a thermoplastic resin composition comprising an ethylene-vinyl alcohol copolymer and a polyamide resin.

The ethylene-vinyl alcohol copolymer and the polyamide resin which constitute the thermoplastic resin composition of the present invention are characterized in that only one maximal peak point assignable to crystallization is observed in the curve of heat flow versus temperature of a melt-kneaded product of 25 parts by weight of the ethylene-vinyl alcohol copolymer and 75 parts by weight of the polyamide resin in a cooling process by differential scanning calorimetry (DSC).

In other words, the ethylene-vinyl alcohol copolymer and the polyamide resin to be used in the present invention need to be a combination such that, when a melt-kneaded product of 25 parts by weight of the ethylene-vinyl alcohol copolymer and 75 parts by weight of the polyamide resin is prepared and a curve of heat flow versus temperature of the melt-kneaded product in a cooling process is measured by differential scanning calorimetry, only one maximal peak point assignable to crystallization is observed in the measured curve versus temperature.

The method for producing a thermoplastic resin composition of the present invention is a method for producing a thermoplastic resin composition comprising an ethylene-vinyl alcohol copolymer and a polyamide resin, the method comprising a step of selecting a combination of an ethylene-vinyl alcohol copolymer and a polyamide resin such that, when a melt-kneaded product of 25 parts by weight of the ethylene-vinyl alcohol copolymer and 75 parts by weight of the polyamide resin is prepared and a curve of heat flow versus temperature in a cooling process is measured for each melt-kneaded product by differential scanning calorimetry, only one maximal peak point assignable to crystallization is observed in the curve versus temperature.

Figure 1:
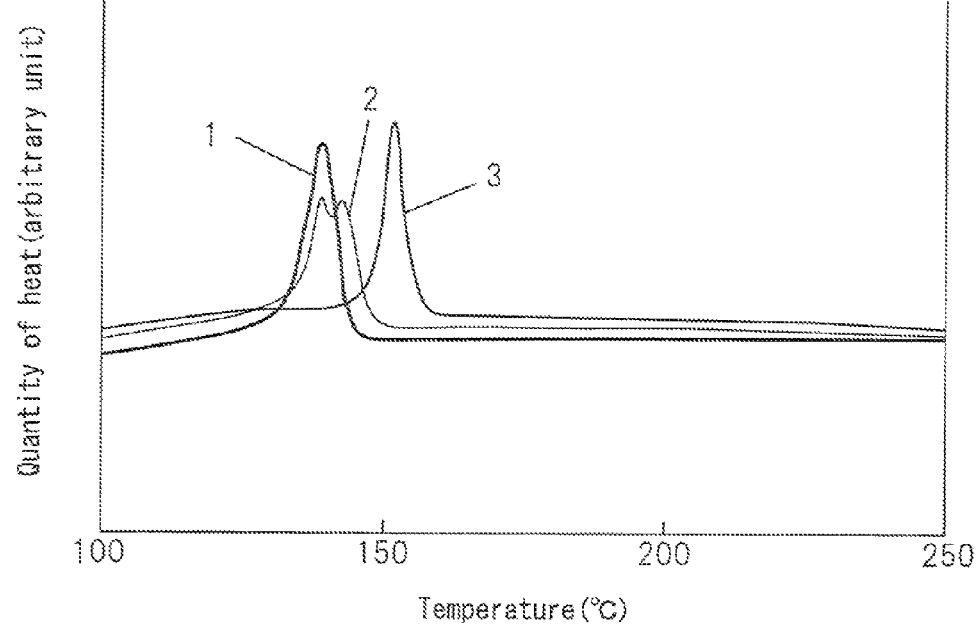
FIG. 1 illustrates the curve of heat flow versus temperature of a melt-kneaded product of a high ethylene content ethylene-vinyl alcohol copolymer and Nylon 612 in a cooling process by differential scanning calorimetry.

FIG. 1 is the curve (hereinafter also referred to as "DSC curve") of heat flow versus temperature of a melt-kneaded product of a high ethylene content ethylene-vinyl alcohol copolymer (manufactured by The Nippon Synthetic Chemical Industry Co., Ltd., "SoarnoL" (registered trademark) H4815B, ethylene content: 48 mol %) and Nylon 612 (manufactured by Ube Industries, Ltd. "UBE Nylon" 7034B) in a cooling process by differential scanning calorimetry.

In FIG. 1, curve 1 is a DSC curve of a melt-kneaded product in which ethylene-vinyl alcohol copolymer/polyamide resin (weight ratio)=75/25; curve 2 is a DSC curve of a melt-kneaded product in which ethylene-vinyl alcohol copolymer/polyamide resin (weight ratio)=50/50; and curve 3 is a DSC curve of a melt-kneaded product in which ethylene-vinyl alcohol copolymer/polyamide resin (weight ratio)=25/75.

Figure 2:
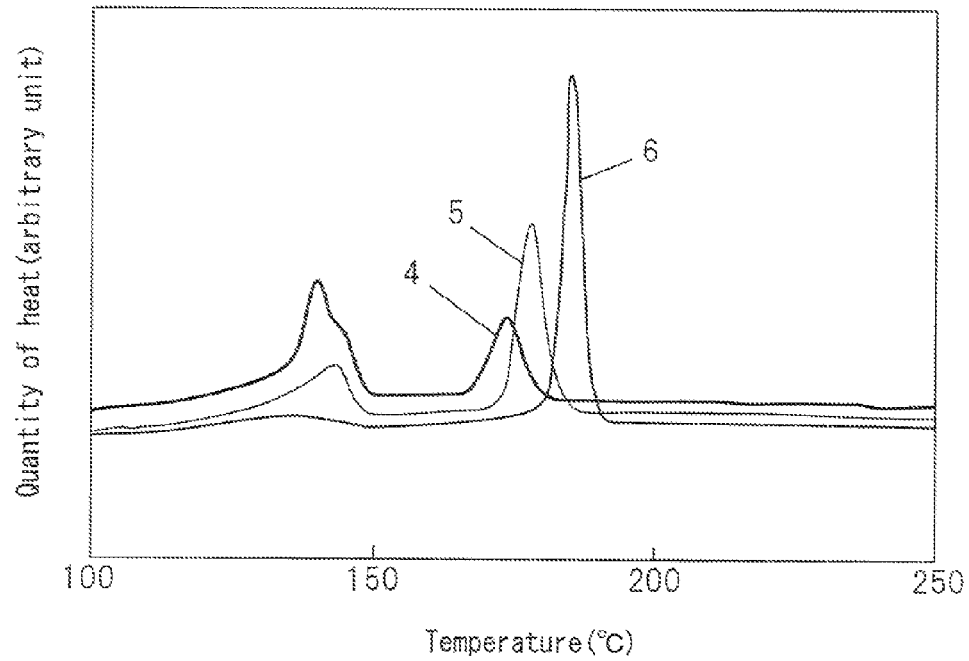
FIG. 2 illustrates the curve of heat flow versus temperature of a melt-kneaded product of a high ethylene content ethylene-vinyl alcohol copolymer and Nylon 6 in a cooling process by differential scanning calorimetry.

FIG. 2 illustrates a DSC curve of a high ethylene content ethylene-vinyl alcohol copolymer (manufactured by The Nippon Synthetic Chemical Industry Co., Ltd., ethylene-vinyl alcohol copolymer "SoarnoL" (registered trademark) H4815B) and Nylon 6 (manufactured by Ube Industries, Ltd., "UBE Nylon" 1022B).

In FIG. 2, curve 4 is a DSC curve of a melt-kneaded product in which ethylene-vinyl alcohol copolymer/polyamide resin (weight ratio)=75/25; curve 5 is a DSC curve of a melt-kneaded product in which ethylene-vinyl alcohol copolymer/polyamide resin (weight ratio)=50/50; and curve 6 is a DSC curve of a melt-kneaded product in which ethylene-vinyl alcohol copolymer/polyamide resin (weight ratio)=25/75.

As seen from FIG. 1, by using a combination of a high ethylene content ethylene-vinyl alcohol copolymer (manufactured by The Nippon Synthetic Chemical Industry Co., Ltd., "SoarnoL" (registered trademark) H4815B) and Nylon 612 (manufactured by Ube Industries, Ltd. "UBE Nylon" 7034B), only one maximal peak point assignable to crystallization is observed in each of the DSC curves of the melt-kneaded products whose blending ratio is 25/75. Therefore, a thermoplastic resin composition comprising a high ethylene content ethylene-vinyl alcohol copolymer (manufactured by The Nippon Synthetic Chemical Industry Co., Ltd. "SoarnoL" (registered trademark) H4815B) and Nylon 612 (manufactured by Ube Industries, Ltd. "UBE Nylon" 7034B) corresponds to a thermoplastic resin composition of the present invention.

As seen from FIG. 1, two maximal peak points assignable to crystallization are observed in a DSC curve of a melt-kneaded product whose blending ratio is 50/50. However, in the present invention, it is not necessary that only one maximal peak point assignable to crystallization is observed in the DSC curve of a melt-kneaded product of 50 parts by weight of ethylene-vinyl alcohol copolymer and 50 parts by weight of polyamide resin.

As seen from FIG. 2, by using a combination of a high ethylene content ethylene-vinyl alcohol copolymer (manufactured by The Nippon Synthetic Chemical Industry Co., Ltd., "SoarnoL" (registered trademark) H4815B) and Nylon 6 (manufactured by Ube Industries, Ltd. "UBE Nylon" 1022B), two maximal peak points assignable to crystallization are observed in the DSC curve of a melt-kneaded product whose blending ratio is 25/75 (curve 6, approximately at 130 to 140° C. and approximately at 180° C.). Therefore, a thermoplastic resin composition comprising a high ethylene content ethylene-vinyl alcohol copolymer (manufactured by The Nippon Synthetic Chemical Industry Co., Ltd., "SoarnoL" (registered trademark) H4815B) and Nylon 6 (manufactured by Ube Industries, Ltd. "UBE Nylon" 1022B) does not correspond to the thermoplastic resin composition of the present invention. Incidentally, of the two crystallization peaks, the crystallization peak at the low-temperature side is a crystallization peak caused by ethylene-vinyl alcohol copolymer; the crystallization peak at the high-temperature side is a crystallization peak caused by Nylon 6.

Preparation of a melt-kneaded product and differential scanning calorimetry are performed as follows.

An ethylene-vinyl alcohol copolymer and a polyamide resin are fed into a twin screw kneading extruder at a weight ratio of 25/75, and kneaded at a temperature of 230° C. for a residence time of about five minutes. Then the melt-kneaded product is extruded from a die attached to a discharge port in a strand shape, and the obtained strand extrudate is pelletized with a resin pelletizer to obtain a pellet-shaped melt-kneaded product.

Differential scanning calorimetry (DSC) is performed on the obtained pellet. In the DSC measurement, the temperature was elevated to 260° C., and the quantity of heat in a cooling process of 10° C./min is measured to obtain the curve of heat flow versus temperature.

The thermoplastic resin composition of the present invention may further comprises other ethylene-vinyl alcohol copolymer or polyamide resin as long as it comprises ethylene-vinyl alcohol copolymer and polyamide resin such that only one maximal peak point assignable to crystallization is observed in the curve of heat flow versus temperature of a melt-kneaded product of 25 parts by weight of ethylene-vinyl alcohol copolymer and 75 parts by weight of polyamide resin in a cooling process by differential scanning calorimetry (DSC).

For example, a thermoplastic resin composition comprising a high ethylene content ethylene-vinyl alcohol copolymer (manufactured by The Nippon Synthetic Chemical. Industry Co., Ltd. "SoarnoL" (registered trademark)

H4815B), Nylon 612 (manufactured by Ube Industries, Ltd., "UBE Nylon" 7034B), and Nylon 6 (manufactured by Ube Industries, Ltd. "UBE Nylon" 1022B) corresponds to a thermoplastic resin composition of the present invention.

Incidentally, in the DSC curve of a melt-kneaded product of 25 parts by weight of a high ethylene content ethylene-vinyl alcohol copolymer (manufactured by The Nippon Synthetic Chemical Industry Co., Ltd., "SoarnoL" (registered trademark) H4815B), 75 parts by weight of Nylon 612 (manufactured by Ube Industries, Ltd. "UBE Nylon" 7034B), and Nylon 6 (manufactured by Ube Industries, Ltd. "UBE Nylon" 1022B), two crystallization peaks caused by high ethylene content ethylene-vinyl alcohol copolymer and Nylon 612, and caused by Nylon 6 are observed.

When the other ethylene-vinyl alcohol copolymers are contained, the amount of the other ethylene-vinyl alcohol copolymers is 80% by weight or smaller, more preferably, 70% by weight or smaller, and further preferably, 60% by weight or smaller with respect to the total amount of the ethylene-vinyl alcohol copolymer.

When the other polyamide resins are contained, the amount of the other polyamide resins is 90% by weight or smaller, more preferably, 80% by weight or smaller, and further preferably, 70% by weight or smaller with respect to the total amount of the polyamide resins.

Ethylene-vinyl alcohol copolymer (hereinafter, also referred to as "EVOH") which is used in the present invention is a copolymer composed of an ethylene unit (—CH$_2$CH$_2$—) and a vinyl alcohol unit (—CH$_2$—CH(OH)—), and may contain other constituent unit in addition to the ethylene unit and vinyl alcohol unit without inhibiting the advantages of the present invention. The content (hereinafter, also referred to as "ethylene content") of the ethylene unit in the ethylene-vinyl alcohol copolymer which is used in the present invention is preferably 25 to 60 mol %. When the content of the ethylene unit in the ethylene-vinyl alcohol copolymer is too small, flexibility of the ethylene-vinyl alcohol copolymer is deteriorated, thereby reducing durability. Conversely, when the content of the ethylene unit is too large, the air permeability increases. Herein, an ethylene-vinyl alcohol copolymer having an ethylene content of 25 mol % or higher and lower than 38 mol % is referred to as a "low ethylene content ethylene-vinyl alcohol copolymer", and an ethylene-vinyl alcohol copolymer having an ethylene content of 38 mol % to 60 mol % is referred to as a "high ethylene content ethylene-vinyl alcohol copolymer". The ethylene-vinyl alcohol copolymer is a saponified product of an ethylene-vinyl acetate copolymer, and the degree of saponification thereof is preferably 90% or higher. When the degree of saponification of the ethylene-vinyl alcohol copolymer is too small, the air permeability increases. The ethylene-vinyl alcohol copolymer is commercially available, and examples thereof include "SoarnoL" (registered trademark) H4815B, A4412B, DC3212B, and V2504RB which are manufactured by The Nippon Synthetic Chemical Industry Co., Ltd., and "EVAL" (registered trademark) H171B manufactured by KURARAY CO., LTD.

The polyamide resin is preferably selected from a group consisting of Nylon 11, Nylon 12, Nylon 6, Nylon 66, Nylon 610, Nylon 612, multicomponent copolymer Nylon, Nylon MXD6, and Nylon 6T.

The amount of the polyamide resin is preferably 5 to 80% by weight, more preferably 10 to 70% by weight, and further preferably 15 to 60% by weight with respect to the total amount of the ethylene-vinyl alcohol copolymer and the polyamide resin. When the amount of the polyamide resin is too small, the thermal resistance of the thermoplastic resin composition becomes insufficient; conversely, when the amount of the polyamide resin is too large, deterioration of the air permeability before fatigue is caused.

The polyamide resin may be a modified polyamide resin. Herein, the modified polyamide resin refers to one which is obtained by melt-kneading a polyamide resin and a compound which can react with a terminal amino group of a polyamide resin. The compound which can react with a terminal amino group of a polyamide resin is hereinafter also referred to as an "amino group-reactive compound". Since the modified polyamide resin has a small amount of a terminal amino group or does not have a terminal amino group, fluidity is maintained even in the case of addition of the large amount of a modified rubber including an acid anhydride group or an epoxy group, thereby facilitating production of a film.

Examples of the amino group-reactive compound include mono-functional epoxy compounds, isocyanate group-containing compounds, acid anhydride group-containing compounds, and halogenated alkyl group-containing compounds. From the viewpoint of reactivity with a terminal amino group of the polyamide resin, preferred are mono-functional epoxy compounds.

Examples of the mono-functional epoxy compounds include ethylene oxide, epoxy propane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3- epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycyclododecane, 3,4-epoxycyclopentane, 3,4-epoxycyclohexene, 3,4-epoxycycloheptene, 3,4-epoxycyclooctane, 3,4-epoxycyclononene, 1,2-epoxycyclodecene, 1,2-epoxycycloundecane, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether and p-sec-butylphenyl glycidyl ether. From the viewpoint of the compatibility of the polyamide resin, particularly preferred are epoxy compounds having 3 to 20 carbon atoms, and preferably 3 to 13 carbon atoms, and having ether and/or a hydroxyl group. From the viewpoint of the compatibility of the polyamide resin, epoxy compounds having 3 to 20 carbon atoms are preferred, and preferably 3 to 13 carbon atoms, and having ether and/or a hydroxyl group.

Although the method of melt-kneading the polyamide resin and the amino group-reactive compound is not particularly restricted, for example, a polyamide resin and an amino group-reactive compound are fed into a twin screw kneader and melt-kneaded at a temperature of the melting point of the polyamide resin, preferably at a temperature 20° C. higher than the melting point, for example, 240° C. Time period of melt-kneading is, for example, 1 to 10 minutes, preferably, 2 to 5 minutes.

The amount of the amino group-reactive compound which is used for modifying the polyamide resin is 0.05 to 5 parts by weight with respect to 100 parts by weight of the polyamide resin, and preferably 1 to 3 parts by weight with respect thereto. When the amount of the amino group-reactive compound is too small, fluidity improving effect is small in the case of addition of the large amount of the modified rubber, which is not preferred. Conversely, when the amount of the amino group-reactive compound is too large, the low-temperature durability (repeated fatigability) of the polyamide resin is deteriorated, which is not preferred.

The thermoplastic resin composition of the present invention may further comprise a modified rubber including an acid anhydride group or an epoxy group. A modified rubber including an acid anhydride group or an epoxy group is rubber including an acid anhydride group or an epoxy group, in which an acid anhydride group or an epoxy group is introduced in the rubber. From the viewpoint of the compatibility with the polyamide resin, the modified rubber is preferably rubber including an acid anhydride group.

Rubber constituting the modified rubber is not particularly restricted, and examples thereof include ethylene-α-olefin copolymer, ethylene-unsaturated carboxylic acid copolymer, and ethylene-unsaturated carboxylic acid ester copolymer. Specifically, examples of the modified rubber preferably include ethylene-α-olefin copolymer, ethylene-unsaturated carboxylic acid copolymer, or ethylene-unsaturated carboxylic acid ester copolymer each including an acid anhydride group or an epoxy group. Examples of the ethylene-α-olefin copolymer include ethylene-propylene copolymer, ethylene-butene copolymer, ethylene-hexene copolymer, and ethylene-octene copolymer. Examples of the ethylene-unsaturated carboxylic acid copolymer include ethylene-acrylic acid copolymer, and ethylene-methacrylic acid copolymer. Examples of the ethylene-unsaturated carboxylic acid ester copolymer include ethylene-methyl acrylate copolymer, ethylene-methyl methacrylate copolymer, ethylene-ethyl acrylate copolymer, and ethylene-ethyl methacrylate copolymer.

The modified rubber having an acid anhydride group can be produced, for example, by reaction of an acid anhydride and peroxide with rubber. The content of the acid anhydride group in the modified rubber having an acid anhydride group is preferably 0.01 to 1 mol/kg, and more preferably 0.05 to 0.5 mol/kg. When the content of the acid anhydride group is too small, dispersion of the modified rubber is deteriorated, whereas when the content of the acid anhydride group is too large, processability is deteriorated. In addition, the modified rubber having an acid anhydride group is commercially available, so that its commercially available product can be used. Examples of the commercially available product of the rubber include a maleic anhydride modified ethylene-propylene copolymer (TAFMER (MP-0620) and a maleic anhydride modified ethylene-butene copolymer (TAFMER (MP-7020), manufactured by Mitsui Chemicals, Inc.

The modified rubber having an epoxy group can be produced, for example, by copolymerization of glycidyl methacrylate with rubber. Although the copolymerization ratio is not limited, for example, the amount of glycidyl methacrylate with respect to 100 parts by weight of rubber is 10 to 50 parts by weight. The content of the epoxy group in the modified rubber having an epoxy group is preferably 0.01 to 5 mol/kg, and more preferably 0.1 to 1.5 mol/kg. When the content of the epoxy group is too small, dispersion of the modified rubber is deteriorated, whereas when the content of the epoxy group is too large, processability is deteriorated. In addition, the modified rubber having an epoxy group is commercially available, so that its commercially available product can be used. Examples of the commercially available product of the rubber include an epoxy modified ethylene-methyl acrylate copolymer (ESPRENE (registered trademark) EMA2752) manufactured by Sumitomo Chemical Co., Ltd.

The amount of the modified rubber in the thermoplastic resin composition is preferably 70 to 280 parts by weight, more preferably 80 to 240 parts by weight, and further preferably 90 to 220 parts by weight with respect to 100 parts by weight of the total amount of the ethylene-vinyl alcohol copolymer and the polyamide resin. When the amount of the modified rubber (C) is too small, the low-temperature durability is deteriorated, whereas when the amount of the modified rubber (C) is too large, fluidity in melting reduces, which deteriorates film formability.

The modified rubber is preferably dynamically cross-linked by a cross-linking agent. By dynamically cross-linking, the dispersion state of the modified rubber in the thermoplastic resin composition can be fixed.

Examples of the cross-linking agent include a hydrogen-bonding compound having a functional group which reacts with an acid anhydride group or an epoxy group in the modified rubber and a functional group which can form a hydrogen bond with an amide bond or a hydroxyl group. Examples of the hydrogen-bonding compound having a functional group which reacts with an acid anhydride group or an epoxy group and a functional group which can form a hydrogen bond with an amide bond or a hydroxyl group include a compound which includes, as a functional group reacting with an acid anhydride group or an epoxy group, an amino group, a hydroxyl group, a carboxyl group, or a mercapto group, and which includes, as a functional group which can form a hydrogen bond with an amide bond or a hydroxyl group, a sulfone group, a carbonyl group, an ether linkage, a hydroxyl group, or a nitrogen-containing heterocyclic. Among others, a compound which includes, as a functional group reacting with an acid anhydride group or an epoxy group, an amino group and/or hydroxyl group, and which includes, as a functional group which can form a hydrogen bond with an amide bond or a hydroxyl group, a sulfone group, carbonyl group and/or nitrogen-containing heterocyclic is preferred. Examples of the compound which includes, as a functional group reacting with an acid anhydride group or an epoxy group, an amino group and/or hydroxyl group, and which includes, as a functional group which can form a hydrogen bond with an amide bond or a hydroxyl group, a sulfone group, carbonyl group and/or nitrogen-containing heterocyclic include 3,3'-diaminodiphenyl sulfone, 4,4'-diaminodiphenyl sulfone, 1,3-bis(3-aminophenoxy)benzene, 3,3'-diamino-4,4'-dihydroxydiphenyl sulfone, (4-(4-aminobenzoyl)oxyphenyl) 4-aminobenzoate, 3-amino-1,2,4-triazole, and tris(2-hydroxyethyl)isocyanurate. Among others, 3,3'-diaminodiphenyl sulfone, tris(2-hydroxyethyl)isocyanurate, and 3-amino-1,2,4-triazole are preferred from the viewpoint of improving the cost, safety, and low-temperature durability.

The amount of the cross-linking agent is preferably 0.1 to 2 parts by weight, and more preferably 0.5 to 1 part by weight with respect to 100 parts by weight of the modified rubber. When the amount of the cross-linking agent is too small, the dynamic cross-linking becomes insufficient and fine dispersion of the modified rubber does not be maintained, thereby reducing the durability and gas barrier properties. Conversely, when the amount of the cross-linking agent is too small, the durability is reduced, which is not preferred.

Dynamic cross-linking can be performed by melt-kneading the modified rubber with the cross-linking agent. Although the temperature of melt-kneading is normally a temperature of the melting point of the polyamide resin or higher, the temperature is preferably a temperature 20° C. higher than the melting point of the polyamide resin, for example, from 190 to 290° C. For example, when a polyamide resin whose melting point is 225° C. is used, the temperature is preferably from 245 to 265° C. The time period of melt-kneading is normally from 1 to 10 minutes, and preferably from 2 to 5 minutes. The shear rate during kneading is preferably from 1000 to 8000 sec$^{-1}$, more preferably from 1000 to 5000 sec$^{-1}$.

The thermoplastic resin composition of the present invention can be produced by melt-kneading an ethylene-vinyl alcohol copolymer and a polyamide resin or a modified polyamide resin at a temperature higher than the melting point of the polyamide resin or the modified polyamide resin, preferably at a temperature 20° C. higher than the melting point of the polyamide resin or the modified polyamide resin, for example at 230° C.

When the thermoplastic resin composition of the present invention contains modified rubber, the thermoplastic resin composition of the present invention can be produced by melt-kneading an ethylene-vinyl alcohol copolymer and a polyamide resin or a modified polyamide resin, and modified rubber at a temperature higher than the melting point of the polyamide resin or the modified polyamide resin, preferably at a temperature 20° C. higher than the melting point of the polyamide resin or the modified polyamide resin, for example at 230° C.

The modified rubber does not need to be dynamically cross-linked before melt-kneading with a polyamide resin or a modified polyamide resin and an ethylene-vinyl alcohol copolymer, and, by adding a cross-linking agent when the ethylene-vinyl alcohol copolymer, polyamide resin or modified polyamide resin and modified rubber are melt-knead, the modified rubber can be dynamically cross-linked at the same time when the ethylene-vinyl alcohol copolymer, polyamide resin or modified polyamide resin and modified rubber are melt-kneaded. In other words, by melt-kneading the ethylene-vinyl alcohol copolymer, polyamide resin or modified polyamide resin, modified rubber and a cross-linking agent, a thermoplastic resin composition in which the modified rubber is dynamically cross-linked is obtained.

To the thermoplastic resin composition of the present invention, in addition to the above-described components, various kinds of additives commonly added in resin and rubber compositions, including a reinforcing agent (filler) such as carbon black or silica, a vulcanizing agent or a cross-linking agent, a vulcanization accelerator or a cross-linking accelerator, a plasticizer, various kinds of oils and an aging preventing agent can be added. Such additives can be kneaded with the compositions in a common method to be used for vulcanization or cross-linking. The amounts of these additives to be added can be set to conventionally common additive amounts as long as the amounts thereof do not depart from the intended purpose of the invention.

The thermoplastic resin composition of the present invention can be formed into a film by a T-die equipped extruder, an inflation molding apparatus, or the like. The film can be suitably used as an inner liner of a pneumatic tire.

The pneumatic tire of the present invention is a pneumatic tire including a layer made of the thermoplastic resin composition. The tire can be produced by a conventional method. For example, the thermoplastic resin composition thereof is previously extruded into a film form having a predetermined width and a predetermined thickness to be attached onto a tire molding drum in a cylindrical form. Thereon, material members used in usual tire production are sequentially attached and laminated, such as a carcass layer, a belt layer, and a tread layer made of unvulcanized rubber, and then the drum is pulled out to obtain a green tire. Next, by heat vulcanization of the green tire according to a usual method, an intended pneumatic tire can be produced.

Examples (1) Raw Materials

Raw materials used in Examples and Comparative Examples are as follows.

As the ethylene-vinyl alcohol copolymer, the following two types were used.

EVOH-1: Ethylene-vinyl alcohol copolymer "SoarnoL" (registered trademark) H4815B (ethylene content: 48 mol %) manufactured by The Nippon Synthetic Chemical Industry Co., Ltd.

EVOH-2: Ethylene-vinyl alcohol copolymer "SoarnoL" (registered trademark) D2908 (ethylene content: 29 mol %) manufactured by The Nippon Synthetic Chemical Industry Co., Ltd.

As the polyamide resin, the following four types were used.

Nylon 6: Nylon 6 "UBE Nylon" 10228 manufactured by Ube Industries, Ltd.

Nylon 12: Nylon 12 "UBE Nylon" 3014B manufactured by Ube Industries, Ltd.

Nylon 612: Nylon 61.2 "UBE Nylon" 7034B manufactured by Ube Industries, Ltd.

Nylon 610: Nylon 610 "AMILAN" CM2001 manufactured by Toray Industries, Inc.

As the compound which can bond to a terminal amino group of the polyamide resin, p-sec-butylphenyl glycidyl ether (Epiol (registered trademark) SB manufactured by NOF Corporation) was used.

As the modified rubber, TAFMER (registered trademark) MH7020 manufactured by Mitsui Chemicals, Inc. was used.

As the cross-linking agent, tris(2-hydroxyethyl)isocyanurate (THEIC A manufactured by SHIKOKU CHEMICALS CORPORATION) was used.

(2) Preparation of Melt-Kneaded Product of EVOH and Polyamide Resin and Confirmation of Crystallization Peak EVOH and a polyamide resin listed on Table 1 were melt-kneaded at a weight ratio of 25/75 using a twin screw kneading extruder (manufactured by The Japan Steel Works, Ltd.). After kneading at a temperature of 230° C. and a residence time of about 5 minutes, the melt-kneaded product was extruded in a strand shape from a die attached to a discharge port. The obtained strand extrudate was pelletized using a resin pelletizer to obtain a pellet-shaped melt-kneaded product. For the obtained pellet, differential scanning calorimetry (DSC) was performed. In the DSC measurement, the temperature was elevated to 260° C., and the quantity of heat in a cooling process of 10° C./min was measured to observe a crystallization peak.

The number of maximal peak points assignable to crystallization is listed on Table 1.

TABLE 1

Number of crystallization peaks in DSC curve of melt-kneaded product of EVOH and polyamide resin
Weight ratio of EVOH and polyamide resin is 25/75

|  | EVOH-1 | EVOH-2 |
| --- | --- | --- |
| Nylon 6 | 2 | 1 |
| Nylon 12 | 2 | 2 |
| Nylon 612 | 1 | 1 |
| Nylon 610 | 2 | 2 |

From Table 1, it was found that the thermoplastic resin composition containing EVOH-1 and Nylon 612, the thermoplastic resin composition containing EVOH-2 and Nylon 6, and the thermoplastic resin composition containing EVOH-2 and Nylon 612 corresponded to the thermoplastic resin composition of the present invention.

(3) Preparation of Modified Polyamide Resin

Into a cylinder, 100 parts by weight of polyamide resin (Nylon 6, Nylon 12, Nylon 612, Nylon 610) and two parts by weight of p-sec-butylphenyl glycidyl ether were introduced from a raw material supply port of a twin screw kneading extruder (manufactured by The Japan Steel Works, Ltd.), and transferred to a kneading zone whose temperature was set to 230° C. and whose residence time was set to about five minutes to be melt-kneaded, and the melt-kneaded product was extruded from a die attached to a discharge port in a strand shape. The obtained strand extrudate was pelletized using a resin pelletizer to prepare pellet-shaped modified polyamide resins (modified Nylon 6, modified Nylon 12, and modified Nylon 612, modified Nylon 610).

(4) Preparation of Thermoplastic Resin Composition

An ethylene-vinyl alcohol copolymer, modified polyamide resin, modified rubber, and cross-linking agent were introduced into a cylinder at a weight ratio listed on Table 3 from a raw material supply port of a twin screw kneading extruder (manufactured by The Japan Steel Works, Ltd.), and transferred to a kneading zone whose temperature was set to 230° C. and whose residence time was set to about two to eight minutes to be melt-kneaded, and the melt-kneaded product was extruded from a die attached to a discharge port in a strand shape. The obtained strand extrudate was pelletized using a resin pelletizer to obtain a pellet-shaped thermoplastic resin composition.

(5) Evaluation Method of Thermoplastic Resin Composition

For the obtained thermoplastic resin composition, the air permeability, rate of change in air permeability after fatigue and tire air leakage were evaluated by the following testing method.

(a) Air Permeability

A pellet-shaped thermoplastic resin composition was formed into a sheet with an average thickness of 0.10 mm by using a 550 mm width T-die equipped 40 mm$\phi$ single screw extruder (manufactured by Pla Giken Co., Ltd.) under extrusion conditions of extrusion temperatures: C1/C2/C3/C4/die=210/220/225/230/230° C., a cooling roll temperature of 50° C., and take-up speed of 3 m/min. Next, from this film, a test piece of a length of 20 cm and a width of 20 cm was manufactured, and dried at 150° C. for three hours, and the air permeability of the thermoplastic resin composition film was measured using air as a test gas at a test temperature of 55° C. in accordance with JIS K7126-1 "Determination method of gas permeability of plastic film and sheet (differential pressure method)".

Incidentally, in Table 3, the air permeability is indicated in "$10^{-12}$ cc·cm/cm$^2$·sec·cmHg" unit, and $1 \times 10^{-12}$ cc·cm/cm$^2$·sec·cmHg can be converted to $7.5 \times 10^{-8}$ mm$^3$·mm/mm$^2$·sec·MPa.

(b) Rate of Change in Air Permeability after Fatigue

Of the ingredients listed on Table 2, raw materials excepting a vulcanizing agent were kneaded by a 1.7-liter Banbury mixer at a set temperature of 70° C. for five minutes to obtain a master batch, and then, the vulcanizing agent was kneaded by an 8-inch roll to form a film having a thickness of 0.7 mm. The obtained unvulcanized rubber composition film was laminated with a thermoplastic resin composition film which was manufactured in a similar manner to the testing method in the above "(a) Air permeability" to be vulcanized at 170° C. for 15 minutes. From the obtained laminate, a test piece having a length of 11 cm and a width of 11 cm was manufactured, and the air permeability thereof was measured in a similar manner to the testing method in the above "(a) Air permeability". After measuring the air permeability, the test piece was fatigued by extending and contracting repeatedly for one million times at room temperature at an elongation rate of 20% and at 400 times per min. For the test piece after the fatigue, the air permeability was measured in a similar manner to the testing method in the above "(a) Air permeability" to be denoted as the "air permeability after fatigue". The ratio of the air permeability after fatigue to the air permeability before fatigue is defined as the "rate of change in air permeability after fatigue". When the rate of change in air permeability after fatigue is 1.30 or lower, the composition is considered to pass the test.

TABLE 2

Ingredients of Unvulcanized Rubber Composition

| Raw material | Amount (Parts by weight) |
|---|---|
| Halogenated butyl rubber[1] | 100 |
| GPF carbon black[2] | 30 |
| Wet silica[3] | 20 |
| Aroma oil[4] | 7.5 |
| Zinc flower[5] | 3 |
| Stearic Acid[6] | 1 |
| Sulfur[7] | 1 |
| Vulcanization accelerator[8] | 1.5 |
| Total | 164 |

Footnote:
[1]BROMOBUTYL X2 manufactured by LANXESS Rubber Corporation
[2]HTC#G manufactured by NSCC Carbon Co., Ltd.
[3]Zeosil (Registered trademark) 165GR manufactured by Rhodia Corporation
[4]Extract 4S manufactured by SHOWA SHELL SEKIYU K. K.
[5]Zinc oxide #3 manufactured by SEIDO CHEMICAL INDUSTRY CO., LTD.
[6]Beads Stearic Acid YR manufactured by NOF Corporation
[7]"GOLDEN FLOWER" SULFUR POWDER 150 mesh manufactured by Tsurumi Chemical Industry Co., Ltd.
[8]Nocseller DM manufactured by OUCHI SHINKO CHEMICAL INDUSTRIAL CO., LTD.

(c) Tire Air Leakage

The thermoplastic resin composition was formed into a film having a thickness of 60 μm and a radial tire of 195/65R15 was manufactured in a conventional manner by using the film as an inner liner. The manufactured tire was left to stand at an air pressure of 250 kPa, in an environment of 21° C. for three month to measure change in the tire air pressure. The decreasing amount per one month of the tire air pressure represented in %/month is denoted as "tire air leakage". The tire air leakage was also measured after the manufactured tire was filled with air at a pressure of 140 kPa by using a standard rim defined by JATMA standards in a room and allowed to travel at a room temperature of 38° C., at a load of 300 kN, at a speed of 80 km/h for a distance of 70,000 km by using a drum with an external diameter of 1700 mm. The tire air leakage before travelling is referred to as the "tire air leakage before fatigue", and the tire air leakage after travelling is referred to as the "air permeability after fatigue". The ratio of the air permeability after fatigue to the tire air leakage before fatigue is referred to as "rate of change in tire air leakage due to fatigue". When the rate of change in tire air leakage due to fatigue is 1.25 times or smaller, the composition is considered to pass the test.

(6) Evaluation Result of Thermoplastic Resin Composition

The evaluation results are listed on table 3.

TABLE 3

| | | Comparative Example 1 | Comparative Example 2 | Example 1 | Example 2 | Comparative Example 3 | Comparative Example 4 | Example 3 | Example 4 |
|---|---|---|---|---|---|---|---|---|---|
| EVOH-1 | Parts by weight | 39.2 | 39.2 | 39.2 | 39.2 | 39.2 | | | |
| EVOH-2 | Parts by weight | | | | | | 39.2 | 39.2 | 39.2 |
| Modified Nylon 6 | Parts by weight | 17.1 | 8.6 | | 8.6 | 8.6 | | 17.1 | |
| Modified Nylon 12 | Parts by weight | | 8.0 | | | | 16.1 | | |
| Modified Nylon 612 | Parts by weight | | | 16.7 | 8.3 | | | | 16.7 |
| Modified Nylon 610 | Parts by weight | | | | | 8.1 | | | |
| Modified rubber | Parts by weight | 43.5 | 43.5 | 43.5 | 43.5 | 43.5 | 43.5 | 43.5 | 43.5 |
| Cross-linking agent | Parts by weight | 0.4 | 0.4 | 0.4 | 0.4 | 0.4 | 0.4 | 0.4 | 0.4 |
| Total | Parts by weight | 100.2 | 99.7 | 99.8 | 100.0 | 99.8 | 99.2 | 100.2 | 99.8 |
| Air permeability before fatigue (55° C.) | $10^{-12}$ cc · cm/cm$^2$ · Sec · CmHg | 6.9 | 9.0 | 11.9 | 10.8 | 8.5 | 6.0 | 7.0 | 9.7 |
| Air permeability after fatigue (55° C.) | $10^{-12}$ cc · cm/cm$^2$ · Sec · CmHg | 13.7 | 15.7 | 12.0 | 11.1 | 14.8 | 14.7 | 9.0 | 10.7 |
| Rate of change in air permeability after fatigue | | 1.99 | 1.74 | 1.01 | 1.03 | 1.74 | 2.45 | 1.29 | 1.10 |
| Tire air leakage before fatigue | %/month | 0.80 | 0.90 | 1.02 | 0.97 | 0.88 | 0.77 | 0.81 | 0.94 |
| Tire air leakage after fatigue | %/month | 1.17 | 1.37 | 1.03 | 1.00 | 1.35 | 1.34 | 0.91 | 0.99 |
| Rate of change in tire air leakage | | 1.46 | 1.52 | 1.01 | 1.03 | 1.53 | 1.74 | 1.12 | 1.05 |

From Table 3, it was found that, in Examples 1 and 2 in which EVOH-1 and Nylon 612 were contained, in Example 3 in which EVOH-2 and Nylon 6 were contained, and in Example 4 in which EVOH-2 and Nylon 612 were contained, the rate of change in air permeability after fatigue and the rate of change in tire air leakage were small.

INDUSTRIAL APPLICABILITY

The thermoplastic resin composition of the present invention can be suitably utilized for producing a pneumatic tire. In particular, the thermoplastic resin composition of the present invention can be suitably utilized for an inner liner of a pneumatic tire.

The invention claimed is:

1. A pneumatic tire comprising a layer made of a thermoplastic resin composition comprising an ethylene-vinyl alcohol copolymer and 5 to 80% by weight of a polyamide resin based upon the total amount of the ethylene-vinyl alcohol copolymer and the polyamide resin, wherein only one maximal crystallization peak point is observed in the curve of heat flow versus temperature in a cooling process of a differential scanning calorimetry of a melt-kneaded product of 25 parts by weight of the ethylene-vinyl alcohol copolymer and 75 parts by weight of the polyamide resin; wherein for the differential scanning calorimetry, the temperature of the melt-kneaded product is elevated to 260° C., and the quantity of heat in a cooling process of 10° C./min is measured to observe the crystallization peak.

2. The pneumatic tire according to claim 1, wherein the ethylene content of the ethylene-vinyl alcohol copolymer is 25 to 60 mol %.

3. The pneumatic tire according to claim 2, wherein the thermoplastic resin composition further comprises a modified rubber including an acid anhydride group or an epoxy group.

4. The pneumatic tire according to claim 3, wherein the amount of polyamide resin with respect to the total amount of the ethylene-vinyl alcohol copolymer and the polyamide resin is 10-70% by weight.

5. The pneumatic tire according to claim 4, wherein the thermoplastic resin composition comprises 70 to 280 parts by weight of the modified rubber with respect to 100 parts by weight of the total amount of the ethylene-vinyl alcohol copolymer and the polyamide resin.

6. The pneumatic tire according to claim 3, wherein the thermoplastic resin composition comprises 70 to 280 parts by weight of the modified rubber with respect to 100 parts by weight of the total amount of the ethylene-vinyl alcohol copolymer and the polyamide resin.

7. The pneumatic tire according to claim 2, wherein the amount of polyamide resin with respect to the total amount of the ethylene-vinyl alcohol copolymer and the polyamide resin is 10-70% by weight.

8. The pneumatic tire according to claim 2, wherein the amount of polyamide resin with respect to the total amount of the ethylene-vinyl alcohol copolymer and the polyamide resin is 15-60% by weight.

9. The pneumatic tire according to claim 1, wherein the thermoplastic resin composition further comprises a modified rubber including an acid anhydride group or an epoxy group.

10. The pneumatic tire according to claim 9, wherein the modified rubber including an acid anhydride group or an epoxy group is an ethylene-α-olefin copolymer, ethylene-unsaturated carboxylic acid copolymer, or ethylene-unsaturated carboxylic acid ester copolymer each including an acid anhydride group or an epoxy group.

11. The pneumatic tire according to claim 10, wherein the amount of polyamide resin with respect to the total amount of the ethylene-vinyl alcohol copolymer and the polyamide resin is 10-70% by weight.

12. The pneumatic tire according to claim 10, wherein the thermoplastic resin composition comprises 70 to 280 parts by weight of the modified rubber with respect to 100 parts by weight of the total amount of the ethylene-vinyl alcohol copolymer and the polyamide resin.

13. The pneumatic tire according to claim 9, wherein the amount of polyamide resin with respect to the total amount of the ethylene-vinyl alcohol copolymer and the polyamide resin is 10-70% by weight.

14. The pneumatic tire according to claim 9, wherein the thermoplastic resin composition comprises 70 to 280 parts by weight of the modified rubber with respect to 100 parts by weight of the total amount of the ethylene-vinyl alcohol copolymer and the polyamide resin.

15. The pneumatic tire according to claim 1, wherein the amount of polyamide resin with respect to the total amount of the ethylene-vinyl alcohol copolymer and the polyamide resin is 10-70% by weight.

16. The pneumatic tire according to claim 15, wherein the thermoplastic resin composition comprises 70 to 280 parts by weight of the modified rubber with respect to 100 parts by weight of the total amount of the ethylene-vinyl alcohol copolymer and the polyamide resin.

17. The pneumatic tire according to claim 1, wherein the amount of polyamide resin with respect to the total amount of the ethylene-vinyl alcohol copolymer and the polyamide resin is 15-60% by weight.

18. The pneumatic tire according to claim 17, wherein the thermoplastic resin composition comprises 70 to 280 parts by weight of the modified rubber with respect to 100 parts by weight of the total amount of the ethylene-vinyl alcohol copolymer and the polyamide resin.

19. The pneumatic tire according to claim 1, wherein the thermoplastic resin composition is the inner liner of the pneumatic tire.

20. A method for producing pneumatic tire comprising a layer made of a thermoplastic resin composition comprising an ethylene-vinyl alcohol copolymer and a polyamide resin, the method comprising a step of selecting a combination of an ethylene-vinyl alcohol copolymer and 5 to 80% by weight of a polyamide resin based upon the total amount of the ethylene-vinyl alcohol copolymer and the polyamide resin such that, when a melt-kneaded product of 25 parts by weight of the ethylene-vinyl alcohol copolymer and 75 parts by weight of the polyamide resin is prepared and a curve of heat flow versus temperature in a cooling process is measured for each melt-kneaded product by differential scanning calorimetry, only one maximal crystallization peak point is observed in the curve versus temperature; wherein for the differential scanning calorimetry, the temperature of the melt-kneaded product is elevated to 260° C., and the quantity of heat in a cooling process of 10° C./min is measured to observe the crystallization peak.

* * * * *